No. 815,451. PATENTED MAR. 20, 1906.
J. T. MAYHEW.
ROLLER SEEDING MACHINE.
APPLICATION FILED JULY 25, 1905.
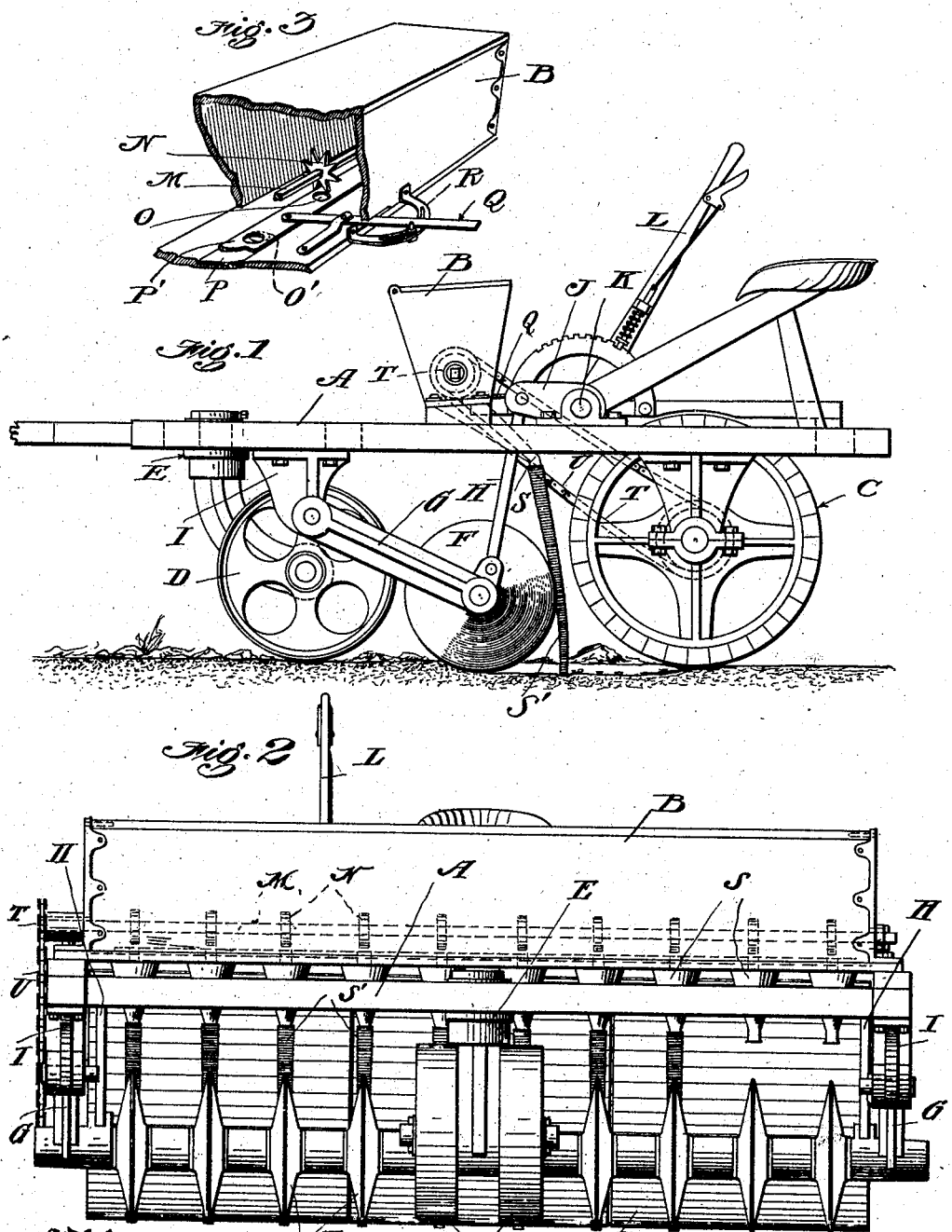

UNITED STATES PATENT OFFICE.

JAMES T. MAYHEW, OF CHINO, CALIFORNIA.

ROLLER SEEDING-MACHINE.

No. 815,451.        Specification of Letters Patent.        Patented March 20, 1906.

Application filed July 25, 1905. Serial No. 271,228.

*To all whom it may concern:*

Be it known that I, JAMES T. MAYHEW, a citizen of the United States, residing at Chino, in the county of San Bernardino and State of California, have invented new and useful Improvements in Roller Seeding-Machines, of which the following is a specification.

The object of my invention is to provide a simple and reliable machine for planting all kinds of seed and grain adapted to be planted in rows or drills, to provide a machine of simple construction that will drill a furrow for the seed, automatically deposit the seed in the drill, and cover the same up and roll and smooth the ground in which the seed or grain is planted. I accomplish these objects by means of the machine herein described and shown in the accompanying drawings, in which—

Figure 1 is a side elevation of my improved seeder. Fig. 2 is a front elevation of the same, and Fig. 3 is a fragmentary detail of the feeding device.

The machine consists, essentially, of the frame A, rectangular in shape, upon which is transversely mounted the feeder-box B. In the frame is mounted a leveling-roller C (this roller may be divided into a number of rollers) and two front supporting-wheels D, placed on the swivel E at the front of the machine. Disposed between the wheels and the rollers are the drill-making disks F, which cut into the soil, making furrows into which the seed is dropped. The disks F are supported by the toggle-bars G and the supporting-bars H. The other ends of the toggle-bars are pivoted on the supports I, secured to the frame. The supporting-bars H are pivotally connected to the lever J on the shaft K. On this shaft K is mounted a regulating-lever L, by the movement of which the disks F can be raised or lowered, thereby making the drill deeper or shallower, as required.

Extending longitudinally through the feed-box B is a revoluble shaft M, on which are mounted the agitator-wheels N, which serve to stir the seed in order that the seed shall not clog the holes O through which it passes. The shaft M is rotated by means of the sprocket-wheel T, mounted on its extremity, and the chain U, which connects with a similar sprocket-wheel on the shaft of the roller C.

There are as many agitator-wheels as there are disks, and also the same number of holes in the bottom of the feed-box B. The agitators are disposed above the feed-holes, and the holes are located above the disks. On the bottom of the feeder-box B are placed two metal slide-plates, the bottom one P being stationary and having feed-holes therethrough, the top slide P' being movable longitudinally along and on the lower slide and is also provided with feed-holes. It will be seen that by moving the top plate the two sets of holes may be made to register more or less exactly, increasing or decreasing the openings through the sides, thereby feeding the seed faster or slower, as desired. The movement of the slide P' is effected by means of the foot-lever Q, which is conveniently located so as to be operated by the foot of the driver. On the outside of the feed-box and directly under the foot-lever is a quadrant R, which is provided with a slot and bolt to limit the movement of the foot-lever, and thereby regulate the size of the openings in the feed-holes.

The seed in the feeder-box on falling through the feed-holes O drop into the spouts S and pass thence through the flexible wire spouts S', which hang directly in behind the disks, into the drills formed by the disk. The drills are then rolled over and filled up by the rollers.

A drag to assist in filling the seed-drills may be arranged to drop on the ground in front of the roller and behind the disks between the paths of the disks and partially fill the seed-drills after they are formed and before the roller reaches them. I have not shown nor claimed this drill-filling attachment, as it is not essential to the successful working of my seeder, but may be used to advantage under certain circumstances.

Having described my invention, what I claim as new, and desire to secure by Letters Patent, is—

In a roller seeding-machine, the combination with a main frame, hopper and roller, of toggle-bars G pivotally supported upon the frame, a shaft carried thereby, drill-making disks carried by the shaft, supporting-bars pivotally connected with the toggle-bars, a shaft K and levers J secured to the shaft and to which the supporting-bars are pivotally connected and a regulating-lever L for regulating the shaft K, and positively raising and lowering the drill-making disks, and spouts leading from the hopper for discharging grain behind the disks.

In witness that I claim the foregoing I have hereunto subscribed my name this 19th day of July, 1905.

JAMES T. MAYHEW.

Witnesses:
    HENRY T. HAZARD,
    MARGARETE C. NICKELESON.